US 9,923,425 B2

(12) United States Patent
Keller et al.

(10) Patent No.: US 9,923,425 B2
(45) Date of Patent: Mar. 20, 2018

(54) PREFORMED COIL TO PRODUCE A SELF-SUPPORTING AIR GAP WINDING, IN PARTICULAR OBLIQUE WINDING OF A SMALL ELECTRICAL MOTOR

(71) Applicant: Dr. Fritz Faulhaber GmbH & Co. KG, Schönaich (DE)

(72) Inventors: Roland Keller, Starzach-Felldorf (DE); Armin Nagel, Holzgerlingen (DE); Andreas Holder, Weil im Schönbuch (DE); Markus Krumbein, Leonberg (DE); Janos Puplics, Schönaich (DE)

(73) Assignee: Dr. Fritz Faulhaber GmbH & Co. KG, Schonaich (DE)

( * ) Notice: Subject to any disclaimer, the term of this patent is extended or adjusted under 35 U.S.C. 154(b) by 639 days.

(21) Appl. No.: 14/280,007

(22) Filed: May 16, 2014

(65) Prior Publication Data
US 2014/0339949 A1    Nov. 20, 2014

(30) Foreign Application Priority Data

May 17, 2013  (DE) .................... 10 2013 105 130
Jun. 12, 2013  (EP) ..................... 13171603
(Continued)

(51) Int. Cl.
*H02K 15/04*    (2006.01)
*H02K 3/04*     (2006.01)
(Continued)

(52) U.S. Cl.
CPC ............ *H02K 3/04* (2013.01); *H01F 41/06* (2013.01); *H02K 3/47* (2013.01); *H02K 15/04* (2013.01);
(Continued)

(58) Field of Classification Search
CPC ............ H02K 3/04; H02K 3/47; H02K 15/04; H02K 15/045; H01F 41/06
See application file for complete search history.

(56) References Cited

U.S. PATENT DOCUMENTS 4,401,907 A    8/1983  Nozawa
5,313,131 A *  5/1994  Hibino ................. H02K 1/12
                                                   310/179
(Continued)

FOREIGN PATENT DOCUMENTS

CN        1960129 A      5/2007
DE        26 35 297      2/1977
(Continued)

OTHER PUBLICATIONS

European Examination Report—dated Jun. 10, 2014.

*Primary Examiner* — Burton Mullins
(74) *Attorney, Agent, or Firm* — Brinks Gilson & Lione

(57) ABSTRACT

A preformed coil (20) to produce a self-supporting air-gap skewed winding of a small electric motor consisting of at least two preformed coils (20) positioned overlapping on a circumference of a winding (6) and a method and device for producing the coil. Two preformed coil sides (24a, 24b) lying in different radial planes are formed which are connected on their front ends (26a, 26b) by front connections. The front connections feature the radial plane offset from the winding offset sections (28) bridging the preformed coil sides (24a, 24b). The preformed coil sides (24a, 24b) are formed curved with a circular shape around a longitudinal axis (16), and the radius of curvature of the one radial outer preformed coil side (24a) is greater than the radius of curvature of the radial inner preformed coil side (24b).

24 Claims, 16 Drawing Sheets

(30) Foreign Application Priority Data

Jul. 18, 2013 (EP) ..................................... 13177009
Feb. 20, 2014 (DE) ........................ 10 2014 102 204

(51) Int. Cl.
*H01F 41/06* (2016.01)
*H02K 3/47* (2006.01)

(52) U.S. Cl.
CPC ....... *H02K 15/045* (2013.01); *H02K 2213/03* (2013.01); *Y10T 29/49009* (2015.01); *Y10T 29/53143* (2015.01)

(56) References Cited

U.S. PATENT DOCUMENTS

| | | | |
|---|---|---|---|
| 5,905,321 A * | 5/1999 | Clifton | F16C 32/0459 310/113 |
| 5,969,457 A | 10/1999 | Clifton et al. | |
| 7,061,153 B1 * | 6/2006 | Foshage | H02K 3/47 310/180 |
| 7,671,504 B2 * | 3/2010 | Rohrer | H02K 3/47 310/179 |
| 2004/0064935 A1 | 4/2004 | Mori et al. | |

FOREIGN PATENT DOCUMENTS

| | | |
|---|---|---|
| DE | 3119325 A1 | 12/1982 |
| DE | 101 14 129 A1 | 9/2002 |
| DE | 10 2009 009 018 A1 | 9/2010 |
| EP | 1 780 871 A1 | 5/2007 |
| EP | 2 180 581 A2 | 4/2010 |

* cited by examiner

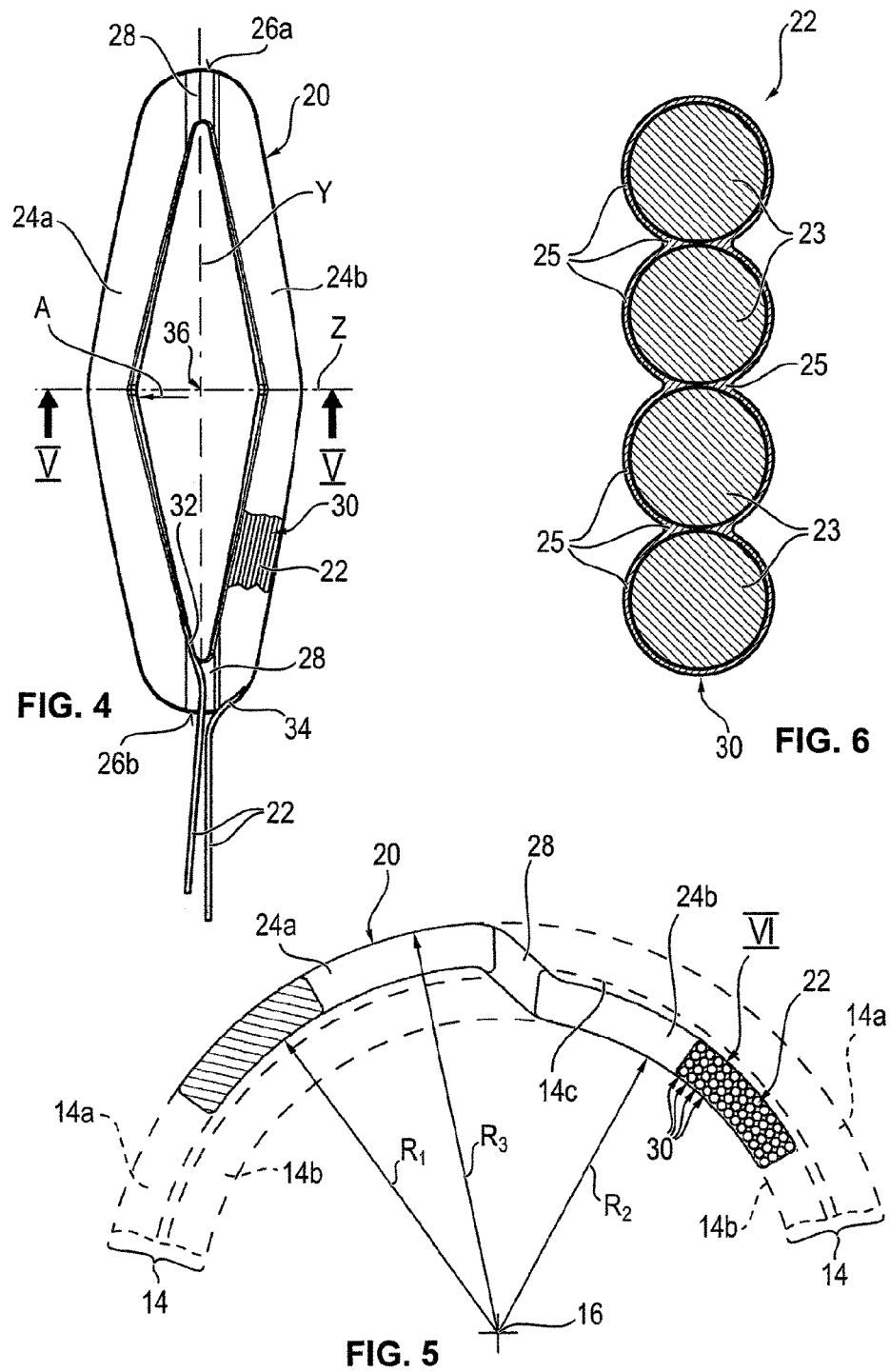

US 9,923,425 B2

PREFORMED COIL TO PRODUCE A SELF-SUPPORTING AIR GAP WINDING, IN PARTICULAR OBLIQUE WINDING OF A SMALL ELECTRICAL MOTOR

CROSS REFERENCE TO RELATED APPLICATIONS

This application claims priority to German Patent Application No. 10 2013 105 130.8, filed May 17, 2013; European Patent Application Nos. 13171603.7, filed Jun. 12, 2013; 13177009.1, filed Jul. 18, 2013; and German Patent Application No. 10 2014 102204.1, filed Feb. 20, 2014.

FIELD OF THE INVENTION

The present invention relates to a preformed coil to produce a self-supporting air-gap winding, in particular a skewed winding, of a small electric motor, consisting of at least two preformed coils positioned so as to overlap at a circumference of the winding, at least one coil of an electrically conducting wire element, wherein two sides of the preformed coil are constructed lying in two different radial planes which are connected with each other at their front ends by front connections. The front connections exhibit a radial plane offset from the offset sections of the coil bridging the preformed coils, and the preformed coils are also constructed curved in a circular-arc shape around the longitudinal axis of the skewed winding and the radius of curvature of the radial outer side of the preformed coil is larger than the radius of curvature of the radial inner side of the preformed coil.

Furthermore, the invention relates to a procedure as well as to a device to produce the inventive preformed coil.

In addition, the invention also relates to a self-supporting air-gap winding, in particular a skewed winding using the inventive preformed coil.

BACKGROUND OF THE INVENTION

A preformed coil of the generic type is known from EP 1 780 871 B1. Here, the individual coils are first spirally wound flatly around an axis running radially inside the finished preformed coil and only then deformed by bending into the finished shape. In order to primarily prevent damage due to mechanical overload, like overstretching of the wire, in areas in which the respective radial offset must be formed, there is the provision according to that document that each coil exhibits additional wire material as a feed line, for example in the form of hair-pin shaped fillets, to facilitate the offset, since additional wire material is required during the production of the offset by a subsequent bending deformation of the completely wound and, as a rule, thermally cemented, preformed coil, in order to prevent an overstretching of the wire in this area. Damage due to deformations of the finished preformed coil can, however, occur; since the wire material can be mechanically overloaded, disadvantageous wire cross-sectional changes as well as damage to the thermosetting varnish coating by tearing or even chipping can occur especially in the area in which the force required for the bending deformation must be applied. Furthermore, the so-called feed line must be very exactly fitted to the required offset; if the feed line is too short or too long, the respective offset cannot be optimally formed without mechanical overload.

DE 101 14 129 A1 likewise describes a tubular, in particular hollow cylindrical, ironless, self-supporting winding of an electric motor, wherein the overlapping preformed coils are formed without radial offset sections with only one radius of curvature. On assembly of the preformed coils to form an entire winding, subsequent deformations and consequent mechanical stress occur, especially in the axially opposite areas in which, because of the overlapping preformed coils, a transition between an inner cylindrical area and an outer cylindrical area, on which the preformed coils rest, must occur.

The underlying object of the present invention is to improve a preformed coil of the type named at the outset, such that damage to the wire material and to its wire cross-section as well as to the area of the offset sections and on the insulation layer of the wire material are prevented during its formation, and that the course of the wire element in the areas of the offset sections is optimized. In addition, an improved, simple and economically feasible manufacturing process should be specified, and a constructively simple and efficient manufacturing device should be made available.

SUMMARY AND INTRODUCTORY DESCRIPTION OF THE INVENTION

This object is inventively attained by the features of the present invention, wherein each winding featuring the sides of the preformed coil and the offset sections is formed by the direct force applied to the wire element forming the coil by the forces occurring during the winding process. Accordingly, the preformed coil is inventively formed exclusively during the winding process, both in the area of its preformed coil sides as well as in the area of the offset sections. Thus, no subsequent bending deformation of the completely wound preformed coil occurs. Thus, inventively the wire material is immediately laid in the desired continuous form with each individual winding. From this a slight plastic deformation of the wire element results because a bending deformation only occurs during the winding process with each individual winding in comparison to a bending deformation of the entire, finished, preformed coil, so that very much lower forces are required. Thus, mechanical damage, like cross-sectional changes of the wire material and tearing or flaking of the wire coating are inventively prevented or at least very definitely reduced.

The inventive preformed coil accordingly is characterized in that in all areas, that is, both in the preformed coil sides curved at different radii of curvature as well as in the offset sections the wire material is deformed without any adverse effect on its wire cross-section or its outer wire coating.

Thus, an optimal shape is achieved with the invention and, in fact, also in the offset sections, because each winding is carefully brought to the required shape without changing its length and thus without mechanical tension stress. The respectively required wire length thus optimally results by itself; a previously prepared "feed line" is not required as a length reservoir.

It is also inventively useful, if the winding direction of several parallel windings forming the sides of the preformed coil and the coil offset sections are aligned.

Furthermore, it can be inventively useful, if the inventive preformed coil is characterized by at least one modified, rhomboidal winding, a trapezoid winding, an elliptical winding, a rhomboidal winding with a flat central part, or a rhomboid-like winding whose transverse axis running to the longitudinal axis in the area of its greatest winding width is shorter than the 4 longitudinal axis between the front ends.

It can also be inventively useful, if the radii of curvature of the sides of the preformed coil along the longitudinal axis are constant from one front end to the other front end, wherein the offset sections run radially aligned to the longitudinal axis. It can likewise be inventively advantageous, if the radii of curvature of the sides of the preformed coil constantly increase along the longitudinal axis from one front end to the other front end, wherein the offset sections run in a radial-axial direction.

Alternatively, it can also inventively be provided that the radii of curvature of the preformed coil sides are constant at the longitudinal axis from one front end to the other front end along a first section and continually increase and decrease along a second section adjacent thereto.

It can also inventively be provided that the front ends of an inventive preformed coil are folded inward at a folding angle from 0 to 90° in relation to the longitudinal axis in the direction of the longitudinal axis, or away from the longitudinal axis, wherein the offset sections are axially aligned. The construction length of an inventive preformed coil can be shortened by means of such folding of the front ends.

Windings with all numbers of falls and for all numbers of pole pairs can be realized from the inventive preformed coils. In particular, three-strand windings of the star circuit type or a triangular circuit can be built for brushless motors (rotary motors). Layered or spiral windings, especially 5-, 7-, 9-, 11- and 13-part, can be built for DC motors. That is not only possible for 2-pole (pole pair number=1) or 4-pole (pole pair number=2) designs of the magnetic circuit but also for designs with a higher number of poles.

The wire element of each winding can be wound spirally and in one or more layers as well as, in particular, crossing-free from the start of the winding to the end of the winding. It can also be useful, if the wire element is formed from a single wire with a circular or longitudinal, for example, rectangular wire cross-section or from a parallel wire with at least two, for example four, parallel wires running next to each other and firmly bonded via a varnish layer or a stranded wire.

An inventive manufacturing process for the production of an inventive preformed coil is characterized in that the preformed coil is formed by directly shaping the wire element during the winding process and the forces thereby acting on the wire element—and thus without any subsequent deformation of the completely wound preformed coil—with its preformed coil sides curved at different radii of curvature and the front winding offset sections, as well as, in particular, also with turned-down front ends. The preformed coil is then preferably temporarily heated directly after the shaping winding process for electrically cementing a thermoset varnish coating of the wire material. For the purpose of this heating an electrical current can advantageously be temporarily applied to the preformed coil. In the process, the time and current are measured such that, depending of the wire cross-section, the current cannot damage the wire element and/or the insulation. Finally, after a specific cooling time, the finished preformed coil can be removed from the device and be further processed. Then, several preformed coils produced in that way are joined to form an inventive skewed winding by overlapping area by area. Mechanical fixing takes place and electric cementing of the thermosetting varnish coatings can additionally be performed, namely, by means of temporary heating.

By means of the optimized shaping of the inventive preformed coil with exactly defined radii of curvature and offset sections, a high degree of copper-filling is achieved inside the finished skewed winding. Each winding strand is hereby advantageously formed by at least one preformed coil. The wiring effort can be reduced for some types of wiring, in that several preformed coils are produced as a chain. In the event of such a chain manufacture of the preformed coils, only the beginning and end of the respective chain must be connected after forming the winding, and a delta connected skewed winding in which the segments of a strand lie in a row is thus obtained.

An inventive manufacturing device for an inventive preformed coil consists of a winding device that can be driven rotatable around a winding axis which is divided into two tool bodies perpendicular to the rotation axis. These tool bodies feature on their front sides facing each other complementary molding surfaces corresponding to the desired inner and outer surface contours of the preformed coils to be wound as a negative contour with lateral areas to shape the curved sides of the preformed coil with different radii of curvature, as well as with transition areas for shaping the coil offset sections. Coil elements to determine the course of the windings of the wire element are positioned as deflection points in the area of at least one of the molding surfaces. The tool bodies are furthermore movable relative to each other in the direction of the rotation axis, namely, between a removal position separated from each other and a winding position converging toward each other, wherein, in the winding position, the molding surfaces are separated via a winding gap which is dimensioned and adjustable with respect to its gap width to match the respective wire element such that the wire element is guided in a defined manner with a slight winding play during winding and can be guided with adapting shaping between the molding surfaces. By rotating the winding device, the wire element fixed with one end in the area of one of the molding surfaces is automatically pulled from outside between the molding surfaces into the winding gap and thereby spirally wound around the winding elements. The wire element thereby fits optimally on the complementary top surface topography of the two molding surfaces; namely, both in the area of the curved lateral areas forming the sides of the preformed coil as well as in the area of the transition areas forming the coil offset sections.

In a preferred embodiment a device is featured to apply an electrical current to the wound and pressed preformed coil via its winding ends dimensioned with respect to time and current such that the preformed coil can be heated by current heat to electrically cement the wire thermoset varnish coating.

After winding and cementing, the finished preformed coil can be removed from the device by moving that the tool bodies to the removal position. The preformed coils produced in this way are then sent for further processing, so that they can be joined to form the inventive, self-supporting skewed winding and be connected by firm bonding. The winding beginnings and ends of the individual preformed coils are electrically wired to each other in a specific manner.

BRIEF DESCRIPTION OF THE DRAWINGS

The invention will hereinafter be described in more detail with reference to the drawings which show:

FIG. 5 shows an enlarged cross-sectional cut through the preformed coil in the cut plane V-V according to FIG. 4, FIG. 12 shows an additional perspective view of the removal position according to FIG. 11, and FIGS. 13 through 17 show different views of an inventive device for manufacturing the preformed coils according to FIG. 6a.

Similar parts are always designated with the same reference numerals in the various figures.

Figure 1:
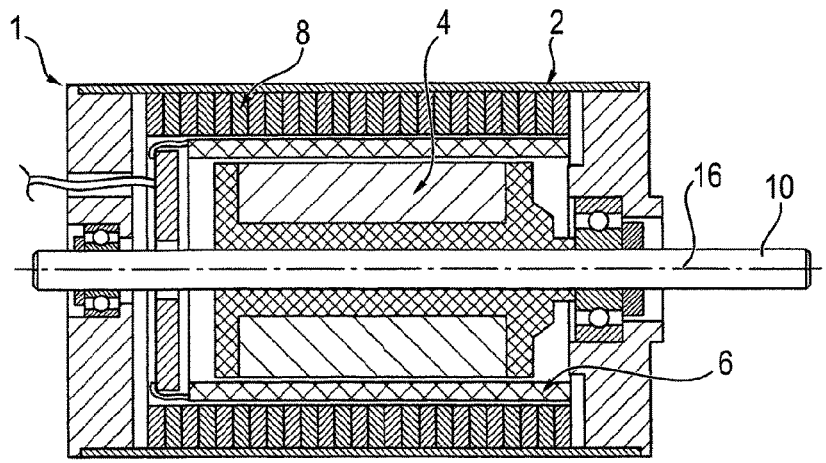
FIG. 1 shows an axial cross-section of an exemplary electric motor with a simplified view of an exemplary self-supporting winding which, by way of example, is positioned on the stator side.

With respect to the following description of the figures, it is claimed with regard to the present invention that the invention has not been limited to the exemplary embodiments and thus not to all or several characteristics of the described combination of characteristics; moreover, each individual partial characteristic of an exemplary embodiment has inventive significance independently of all other partial characteristics described in association therewith and also in combination with any characteristics of another exemplary embodiment.

FURTHER DESCRIPTION OF THE INVENTION

As shown in FIGS. 2 to 5, the winding 6 is in the form of a hollow, segmented winding body 18 which features a central longitudinal axis 16. The segmented winding body 18 is produced from individual preformed coils 20 in particular as a self-supporting, skewed air-gap winding. The number of preformed coils 20 is larger than/equal to two pieces, preferably equal to or greater than three pieces. An embodiment of the inventive preformed coil 20 is shown in FIG. 4. This inventive preformed coil 20 is produced from an electrically conducting wire element 22. This wire element 22 features an outer electric insulation. This wire element 22 can also be an individual round wire provided on its circumference with an insulation layer, for example of copper according to DIN EN 60317-20, 2000/10. Other possible wire element designs are, for example, a parallel wire, several individual wires guided in a parallel manner, a stranded wire, or a profile wire.

The inventive preformed coil 20 consists of at least one 360°—winding of the wire element 22. It is also within the context of the invention to produce a preformed coil consisting of several parallel windings 30 above and next to each other. The number of preformed coils 20 per winding 6 is designated as a segment of the winding 6. All windings 30 of a preformed coil 20 have the same direction of winding, which is mathematically positive, that is, in a clockwise direction, or mathematically negative, that is, counterclockwise. Furthermore all preformed coils 20 of the winding have the same direction of winding. As can be recognized in FIG. 4, the inventive preformed coil 20 preferably features several windings 30 running parallel to each other, wherein each preformed coil 20 features two winding sides or preformed coil sides 24a, 24b, namely the upper preformed coil 24a and the lower preformed coil 24b. On its front sides, which lay opposite each other, the preformed coil 20 features a transition between the preformed coils 24a and 24b, so that a front connection 26a, 26b is given there. The association of all the front connections 26a, 26b of all preformed coils 20 existing in the inventive winding forms the winding head of the inventive skewed winding at its axially opposite ends.

Figure 4A:
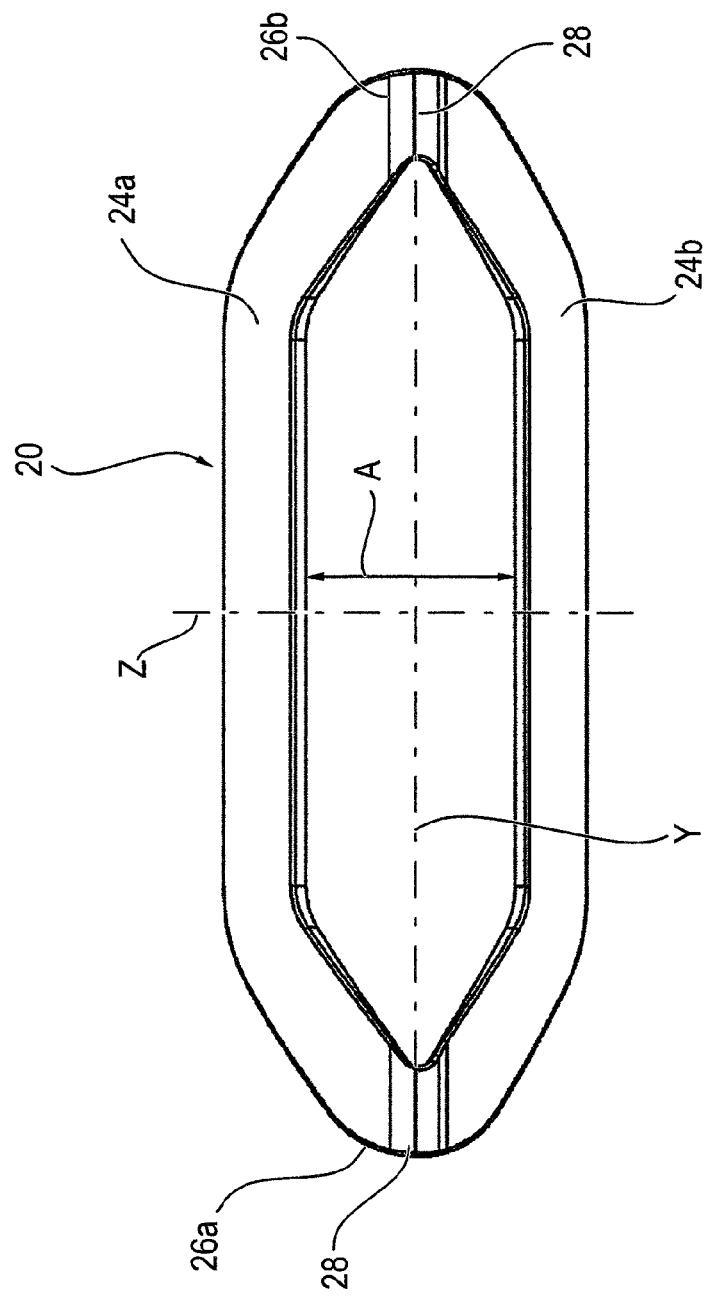
FIG. 4 shows a view of an individual preformed coil of the winding according to FIGS. 2 and 3, FIG. 4a, 4b show alternative geometrical shapes of an inventive preformed coil.
Figure 4B:
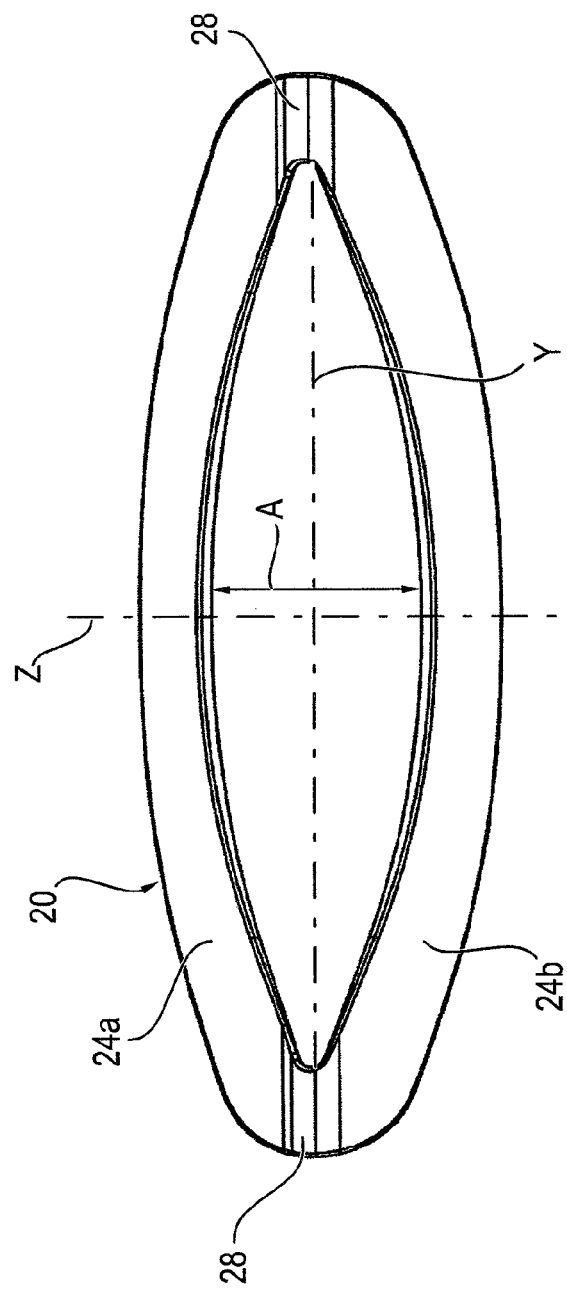

A vertical separation to the diagonal Y through the front connections between the preformed coil sides 24a, 24b is the winding width A. In the inventive skewed winding 6 the winding width A varies between a maximum and zero, which means that both preformed coils 26a, 26b in the inventive skewed winding meet in the area of their front connections 26a, 26b. The inventive preformed coil 20 can be constructed of different shapes; in this respect, reference is made to FIGS. 4, 4a and 4b. Its shape in particular influences the flux linkage of the winding with the magnetic field, the attainable fill factor of the electric wire element 22, and the attainable mechanical strength. A modified rhomboid, as shown in FIG. 4, wherein the diagonal Y connecting the front sides is longer than the vertical through the winding in the area of the largest winding width A, is useful. Furthermore, a modified rhomboid with a straight central part is also possible, see FIG. 4a, or an elliptical shape, see FIG. 4b. In addition, a pure rhomboid is realizable but a trapezoid can also be realized.

Figure 2:
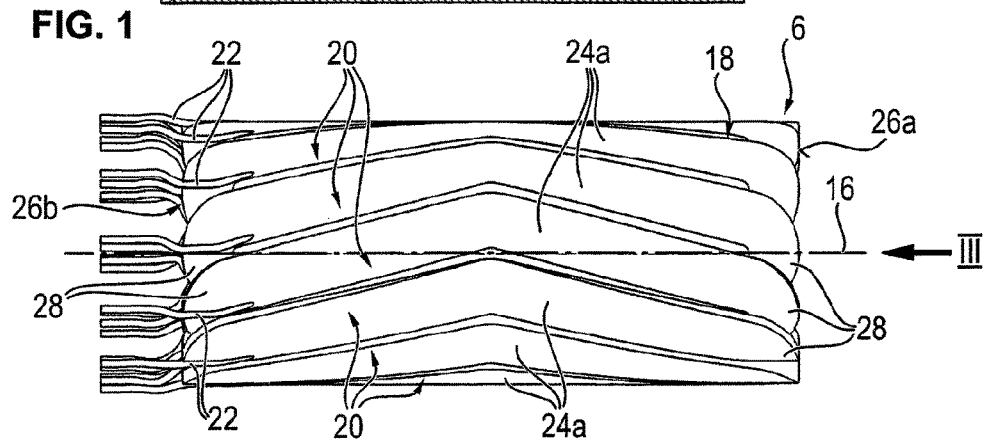
FIG. 2 shows an enlarged lateral view of an inventive, segmented winding with several preformed coils.
Figure 3:
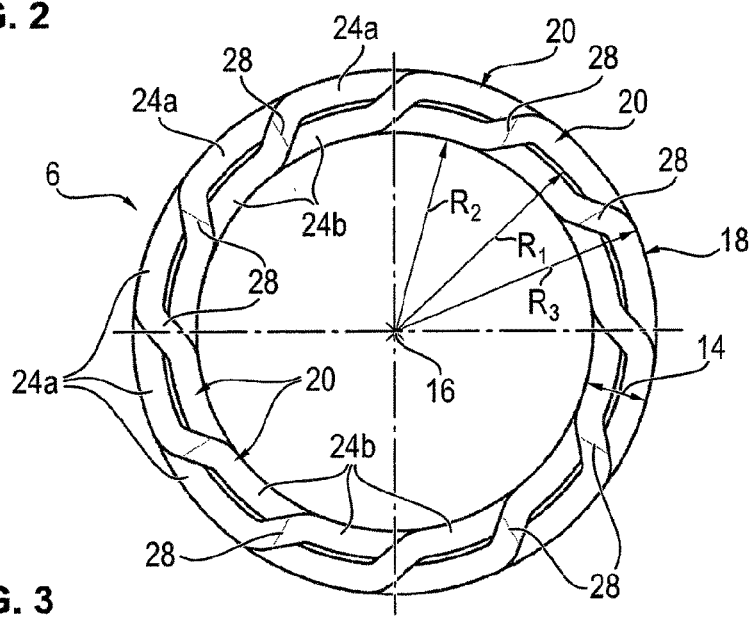
FIG. 3 shows a further enlarged front view of the winding in the axial direction according to the arrow III of FIG. 2.

As can be seen in FIGS. 2 and 3, the preformed coils 20 are positioned on the circumference of the inventive skewed winding, which is constructed tubular, overlapping each other, that is, like roof tiles. In this case, the arrangement is such that the preformed coils 20 lay around the longitudinal axis 16 of the winding 6 with its radial outer preformed coil side 24a on an outer cylinder 14a having the radius $R_3$ and with its radial preformed coil side 24b offset inward resting on a cylinder 14b with a smaller radius $R_2$ compared to $R_3$, wherein the radially aligned inner side of the preformed coil 24a and the radially aligned outer side of the preformed coil 24b rest on a central cylinder 14c with the radius R1, wherein $R_2<R_1<R_3$ so that they rest on each other. Accordingly, the preformed coils 24a and 24b are curved in a circular arc shape, namely relative to the longitudinal axis 16, wherein the preformed coil side 24a has the radii of curvature $R_2$, $R_1$. The cylinders 14a, 14b form a tubular frame 14. Accordingly, the preformed coils 20 run in this frame with their respective preformed coil sides 24a, 24b. Because of the described overlap of the preformed coil 20 at the circumference of the winding 6, the radial preformed coil sides 24b running inwardly offset in the lateral view shown in FIG. 2 are covered by the outwardly offset preformed coil sides 24a lying above, so that the preformed coil sides 24b are not visible.

According to FIGS. 3 and 5, as a result of the described design and arrangement of the preformed coil sides 24a, 24b, they merge into each other in the area of the front ends 26a, 26b via front connections, wherein these front connections bridge the radial plane offset between the preformed coil sides 24a, 24b by means of winding offset sections 28. Accordingly, each winding 22a exhibits two offset sections 28 which connect the preformed coil sides 24a, 24b formed by the winding 22a. In the shown embodiment the winding 6 is constructed as a hollow cylinder with a circular cylindrical cross-section so that the winding body 18 forms a cylinder with a circular cross-section. In such a design the offset sections 28 run in the radial direction between the preformed coil sides 24a, 24b, wherein a gradient inclined at an angle to the radius or a straight line, or slightly arc shaped is present. In this exemplary embodiment the radii of curvature $R_1$, $R_2$, $R_3$ of the preformed coil sides 24a, 24b are constant along the longitudinal axis 16 of the preformed coil 22 from a front end 26a to the other front end 26b.

Figure 6A:
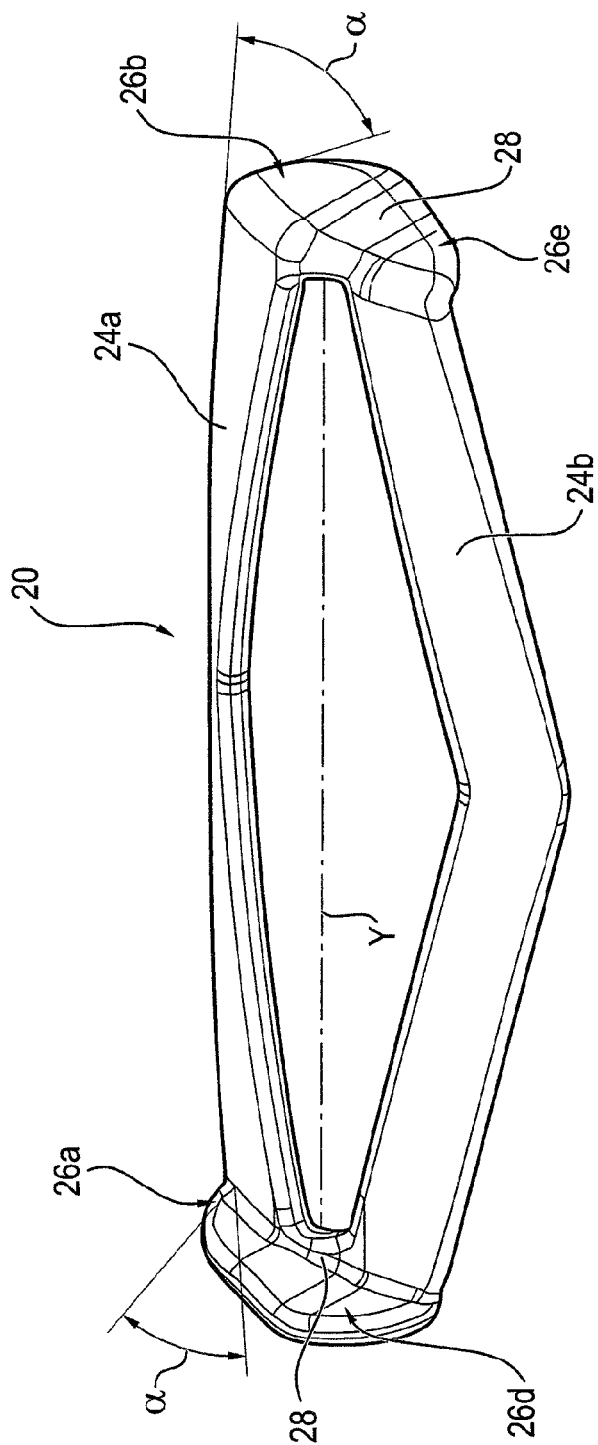
FIG. 6a shows an alternative embodiment of an inventive preformed coil, FIGS. 6b, c, and d show alternative geometrical shapes of the winding body of an inventive skewed winding.
Figure 6B:
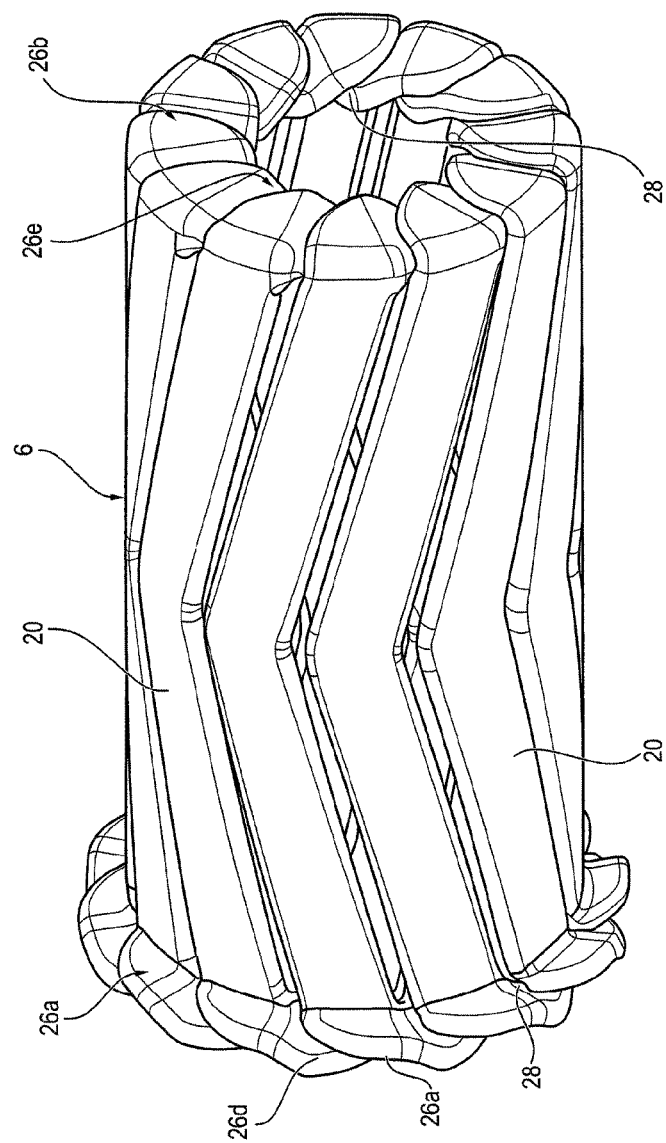
FIG. 6 shows an enlarged cross-sectional cut through a winding position of the wire material designated in an exemplary embodiment as a parallel wire with "VI" in FIG. 5.

FIG. 6a shows an alternative embodiment of an inventive preformed coil 20. In this preformed coil 20 the front ends are perpendicular to the longer diagonal Y which runs between the front ends 26a, 26b, e.g. retracted or folded vertically. The folding angle α can be 0 to 90° in relation to the longitudinal axis or diagonal Y. The folding angle α is thereby the outer angle. In the shown example the folded areas 26d and 26e are folded in the opposite direction. It is also possible in the context of the invention that both ends 26d, 26e are folded in the same direction, either folded in one direction or in the other direction. FIG. 6b shows an embodiment of an inventive winding consisting of a variety of inventive preformed coils 20 with folded front ends 26d, 26e, as shown in FIG. 6a. Here, the front ends 26d are aligned outward away from the longitudinal axis of the winding—as shown in FIG. 6a—that is, folded out, and the opposite front ends 26e are aligned inward in the direction toward the longitudinal axis, that is, folded in. As already mentioned, it is possible in the context of the invention to construct the preformed coils either having front ends folded inward or outward in the same direction, or to provide a folded in or folded out front end only on one end of the preformed coil 20. In the embodiment with the folded in or folded out front ends of the preformed coil 20, the offset section 28 runs in the area of the folded in or folded out front end 26d, 26e, namely in the axial direction.

Figure 6C:
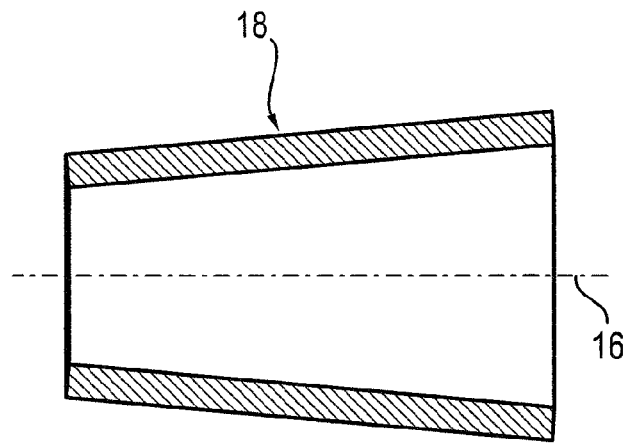

An alternative geometrical shape of a winding body 18 of an inventive winding 6 is shown in FIG. 6c; in this case, the winding body 18 has the shape of a truncated cone. With such a truncated cone-shaped design of the winding body 18, the inventive preformed coils 22 are constructed such that the radii of the preformed coil sides 26a and 26b continuously increase from the end of the preformed coil with the smaller diameter to the end with the larger diameter. In this case, the transition sections 28 run between the preformed coil sides 26a, 26b in the radial-axial direction.

Figure 6D:
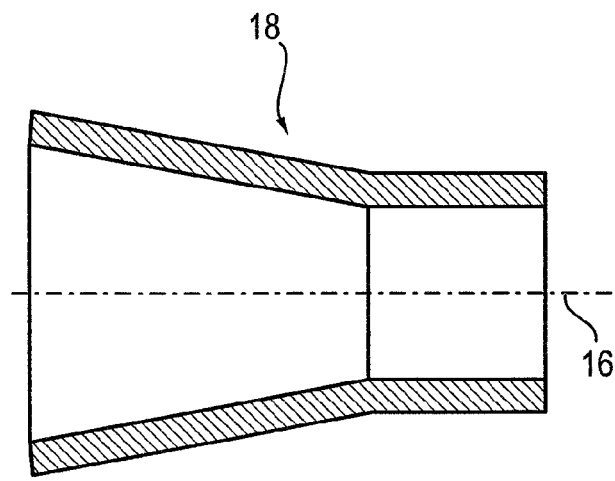
Figure 7:
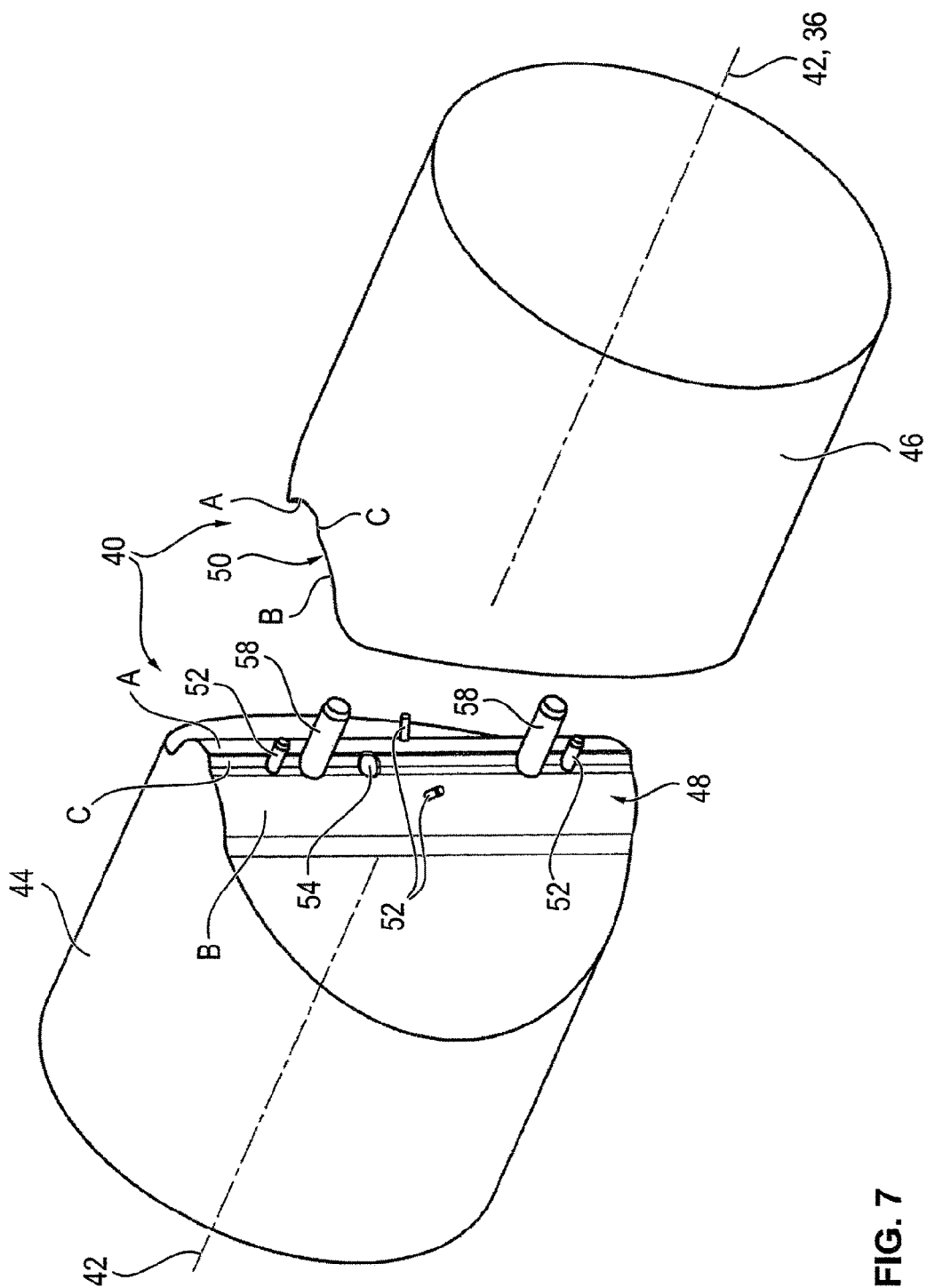
FIG. 7 shows a simplified perspective view of an inventive manufacturing device in the form of a two-part winding device with two tool bodies in an opened removal position.
Figure 8:
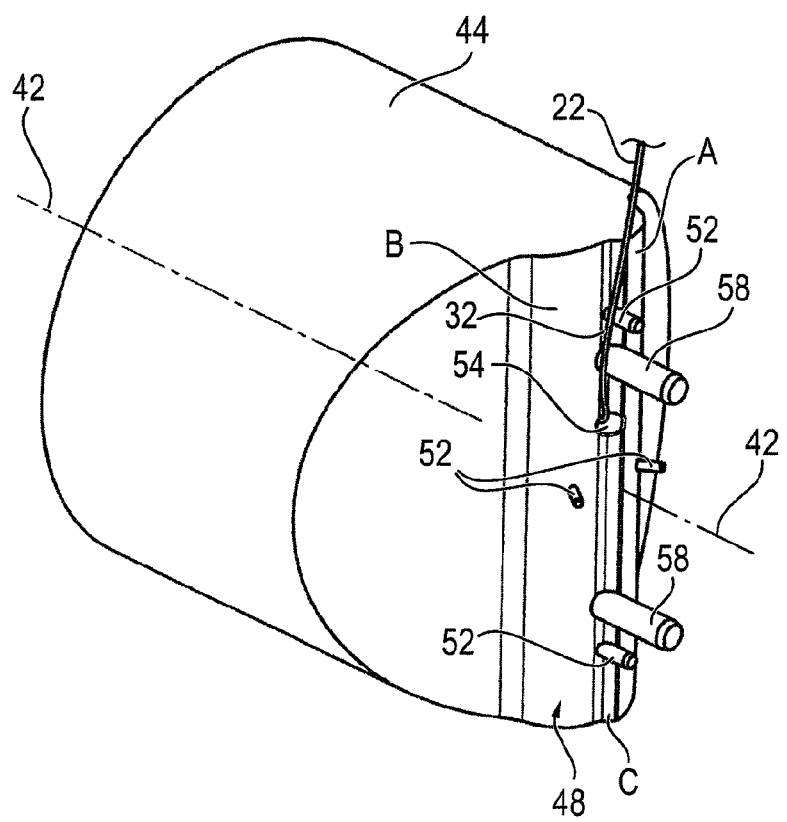
FIG. 8 shows one of the two tool bodies according to FIG. 7 with a fixed end or beginning of a wire element.

FIG. 6d shows a combination of the inventive winding consisting of the embodiment of the winding body 18 according to FIG. 6c and FIG. 6; namely, the winding body 18 here consists of a cylindrical section and a truncated cone-shaped section connecting thereto.

Inventively, each preformed coil is formed by directly shaping the wire element 22 during the winding process, that is, by the effect of the shaping forces occurring during the winding process on the wire element 22 which forms the windings 30, so that there is no subsequent deformation of the completely wound preformed coil 20 with its radii of curvature, $R_1$, $R_2$, $R_3$ of the curved preformed coil sides 24a, 24b as well as with the offset sections 28 connecting them.

Individual windings 30 of the wire element 22 are firmly bonded inside each wound preformed coil 20—in this respect, see the right half of FIG. 5—via a coating, in particular a so-called thermoset varnish, and as a result are fixed in their shape. With regard to the thermoset varnish, as a rule, it is a polyamide coating which becomes thermoplastic by heating and then glues or welds the windings 30 of the wire element 22 together. The wire element 22 preferably still features an electrically insulating layer under the thermoset varnish, especially made of polyurethane.

As shown in FIG. 4, the wire element 22 is spirally wound inside each preformed coil 20 and in one or multiple layers, as well as preferably crossing-free from one inner winding beginning 32 to another outer winding end 34. This winding is carried out around a winding axis 36 running perpendicular to the drawing plane in FIG. 4 which, in the assembled state, runs radially inside the winding body 18. In this case—as shown—the preformed coil 20 can be constructed in a modified rhomboid shape, as seen in a radial top view (FIG. 4) with a longer diagonal in the axial direction and a shorter diagonal in the circumferential direction. In addition, each preformed coil 20 features a flat, rectangular, arc-shaped, winding cross-section, see FIG. 5—based on a cut plane extending perpendicularly to the longitudinal axis 16 of the winding body 18—see plane V-V in FIG. 4—, where it is shown in a simplified hatched manner in the left area of the cross-section.

As shown by way of example in FIGS. 5 and 6, the wire element 22 can advantageously consist of a parallel wire with at least two, as shown, for example, four wires 23 running parallel and firmly bonded, connected in particular via their thermoset varnish coatings 25. In this case, the wires 23 of the parallel wire lie inside the individual windings 30 of the preformed coil 20 next to each other and thus radially above each other in the preformed coil 20.

As an alternative to the parallel wire, an individual wire or a stranded wire can also be used as the wire element 22. In the event of a stranded wire, it can be pressed flat or as an oval and be wound similarly to a parallel wire. In that case, the stranded wire also advantageously runs inside the preformed coil 20 in a cross-free manner, wherein individual wire fibers inside the stranded wire can cross by stranding or transpositioning. A wire with a circular cross-section, in particular a so-called heavy wire, with a large cross-section, can be used as the individual wire such that with a single-layered winding—the radial thickness of the preformed coil corresponds to the wire diameter of the heavy wire, or—with a multilayered winding—the radial thickness of the preformed coil corresponds to the wire diameter multiplied by the number of windings.

Alternatively a so-called flat wire with an elongated, in particular rectangular cross-section can be used as the individual wire, wherein the flat wire is wound similarly to the parallel wire or to the stranded wire that was pressed flat, so that the radial thickness of the preformed coil 20 corresponds to the height of the wire.

An inventive device to produce the preformed coil 20 for the self-supporting skewed winding 6 will be described with reference to FIGS. 7 to 12. This device features a winding device 40 which can be driven to rotate around a rotation axis 42. In this case, the rotation axis 42 corresponds to the winding axis 36 of the preformed coil 20 mentioned above. The winding device 40 is divided into two tool bodies 44 and 46 perpendicular to the rotation axis 42. These tool bodies 44, 46 feature complementary molding surfaces 48, 50 on the front sides facing each other, wherein the molding surface 48 of the one tool body 44 exhibits a convex upper molding surface fitted to the desired inner surface contour of the preformed coil 20 to be wound, while the molding surface 50 of the other tool body 46 features a complementary and thus concave upper molding surface to shape the outer surface contour of the preformed coil 20 to be wound. That means that each molding surface 48, 50 features lateral areas A, B to shape the sides of the preformed coil 24a, 24b curved at different radii of curvature $R_1$, $R_2$, $R_3$, as well as transition areas C between the lateral areas A, B to shape the offset sections 28. The transition areas C have an upper molding surface which corresponds to the negative impression of the transition areas. In this case, in the area of at least one of the molding surfaces protruding winding elements 52 are positioned as deflecting points to determine the course of the windings 30 of the wire element 22, as shown for example in the area of the molding surface 48 of the first tool body 44. These winding elements 52 thus determine the position of the inner deflecting points of the preformed coil 20; to that end, see FIG. 12 in particular, where the completely wound preformed coil 20 is also shown. Furthermore, according to FIGS. 8 and 12, a mount 54 for the winding beginning 32 of the wire element 22 is provided in the area of one of the molding surfaces, for example molding surface 48. This mount 54 can be formed by a terminal opening for a simple frictionally locking insertion of the end of the wire element 22.

Figure 9:
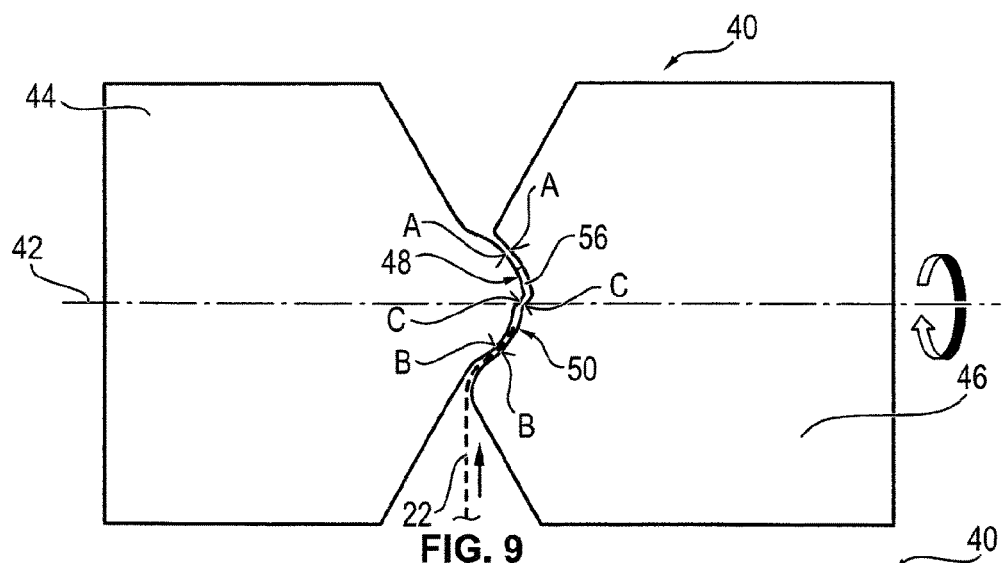
FIG. 9 shows a schematic lateral view of the winding device in a winding position with closed tool bodies during the winding process with a wire element indicated as a dashed line.

As is also shown in FIGS. 7 to 12, the two tool bodies 44, 46 can be moved relative to each other in the direction of the rotation axis 42. To that end, one of the tool bodies can be fixed and the other tool body can be movable. The tool bodies 44, 46 are thus movable between one removable position separated from the other (see FIGS. 7, 11 and 12) and a winding position converging to the other, wherein, in the winding position (see FIG. 9), the molding surfaces 48, 50 are separated via a winding gap 56 which is dimensioned or adjustable to fit on the respective wire element 22, such that the wire element 22 is guided in a defined manner with a slight winding play during winding and can be guided with adapting shaping between the molding surfaces 48, 50. Reference is made to FIG. 9 for the situation during the winding process. The wire element 22 indicated by a dashed line, which has one end fixed in the mount 54, is automatically pulled into the winding gap 56 and thereby laid in a defined manner around the winding elements 52 by the rotation of the winding device 40 with both closed tool bodies 44 and 46 around the rotation axis 42. By the shape of the winding gap 56 defined by the molding surfaces 48, 50 there results a bending to shape the wire element 22 to the molding surfaces 48, 50. The winding device 40 is turned so long or for so many revolutions until the preformed coil 20 is wound with the desired number of windings 30.

Figure 10:
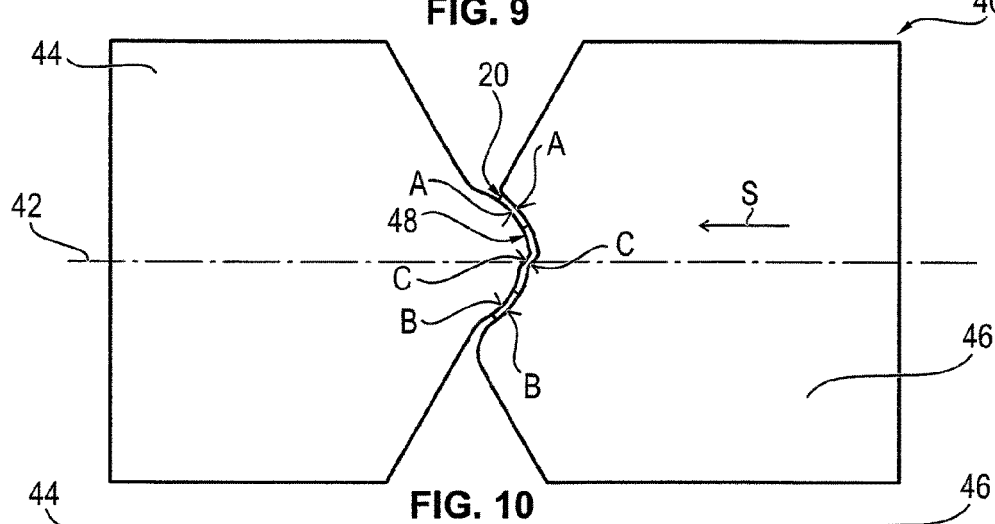
FIG. 10 shows a view similar to FIG. 9, but of the thermal cementing of the preformed coil after the winding process.
Figure 11:
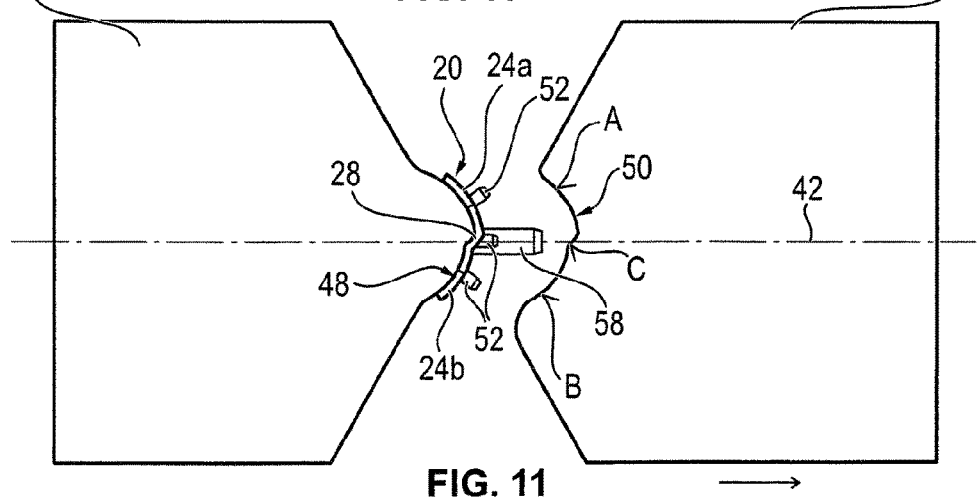
FIG. 11 shows a lateral view similar to FIGS. 9 and 10 in the removal position to remove the wound and cemented preformed coil.

By further moving the tool bodies 44, 46 toward each other out of the winding position along a certain path s—with s being greater than zero and smaller than/equal to 0.5 mm—see FIG. 10—the wound preformed coil 20 can be fixed by removing the winding play. The inventive device also features a device to apply an electric current to the wound and fixed preformed coil 20 via its winding ends dimensioned with respect to time and current such that the preformed coil 20 can be heated for electrically cementing the wire thermoset varnish coating with current heat.

Alternatively, the windings can also be glued with a dip varnish or encapsulated with plastic. Furthermore, the two tool bodies 44, 46 are usefully guided by means of axial or axially parallel guide elements 58 which engage in guide borings 58a and are aligned relative to each other in the direction of rotation. It is thus ensured that the molding surfaces 48, 50 always lie exactly opposite each other and always perfectly fit.

FIGS. 13 to 17 show an inventive device to produce a preformed coil 20 according to FIG. 6a. The same parts as in FIGS. 1 to 12 are characterized with the same reference numerals. Thus, reference can be made in full to the description for FIGS. 1 to 12 relating to the constructive design and function of the device according to FIGS. 13 to 17. In the device according to FIGS. 13 to 17, at the winding gap 56 formed at its opposite ends between the respective molding surfaces 48, 50 the respective tool body 44, 46, viewed in the longitudinal direction Y-Y of the molding surfaces 48, 50, features gap sections 56a, 56b running at an angle of 90° to the molding surfaces 48, 50. These gap sections 56a, 56b run in directions opposite to each other and serve to shape, for example, the front ends 26a, 26b of the preformed coil 20 folded at a right angle, see FIG. 6a. For that reason, the surface extensions 48a, 50a of the molding surfaces 48, 50 enclosing the respective gap sections 56a, 56b have the negative contour of the adjacent surfaces of the front ends 26a, 26b of the preformed coil 20. To form the surface extensions 48a, 50a each tool body 44, 46 features a surface extension 48a and 50a formed by a flat area 59 of the tool body 44, 46 and a tool body attachment 60 formed on the tool bodies 44, 46, wherein the tool body attachment 60 of one tool body 44, 46 covers the surface extension 48a of the other tool body 44, 46 formed by the flat area 59 in the winding position, as a result of which the respective gap sections 56a, 56b are formed, in this respect, in particular see FIGS. 13 and 16.

Figure 12:
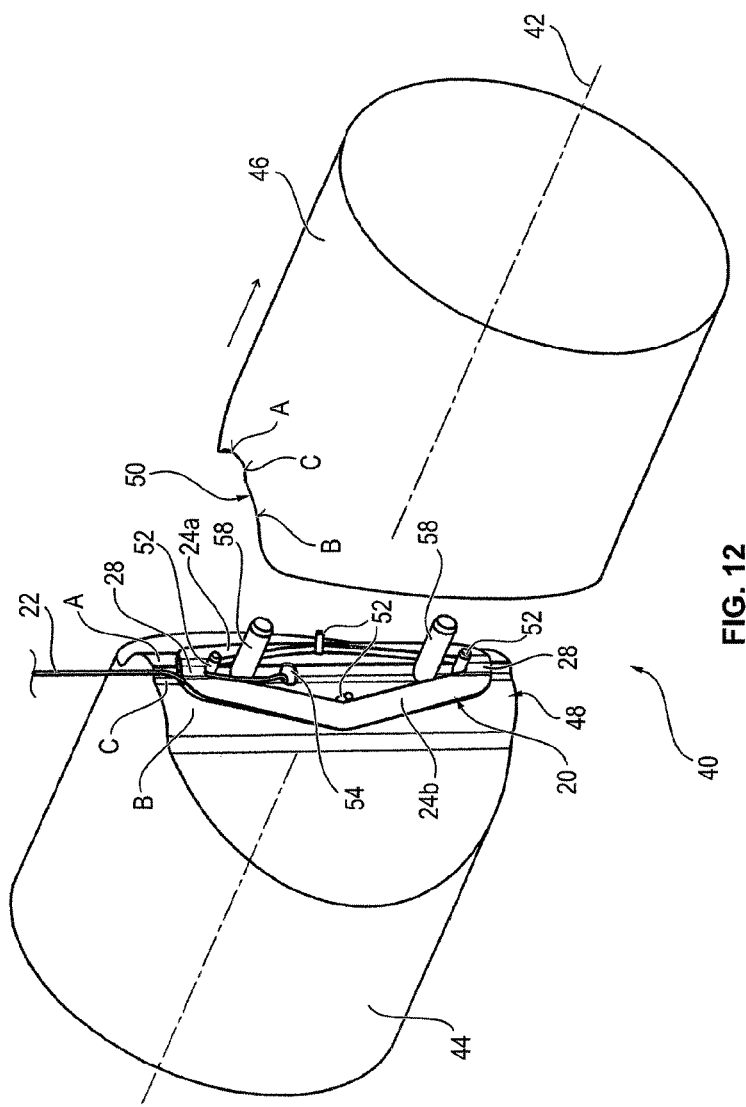
Figure 13:
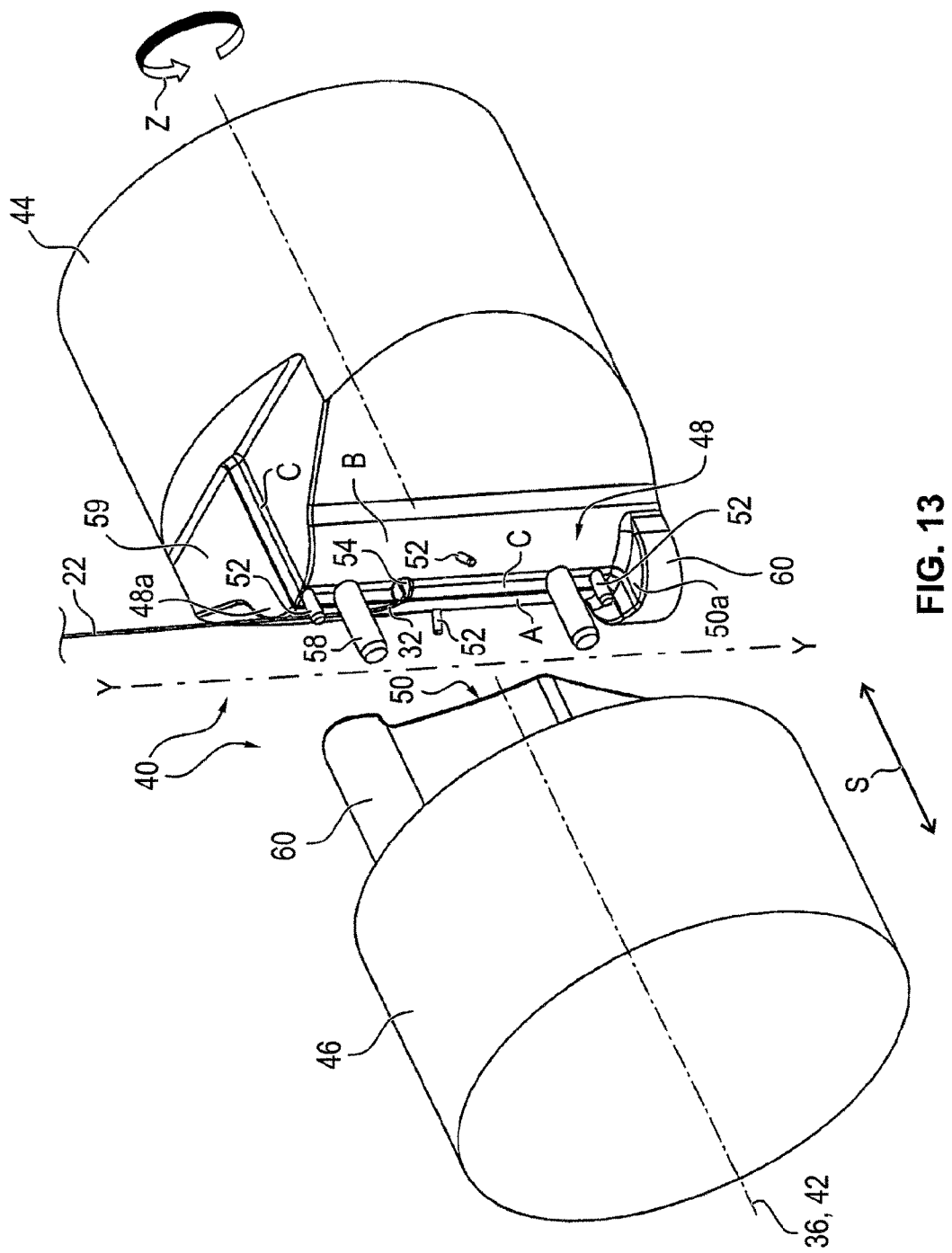
Figure 14:
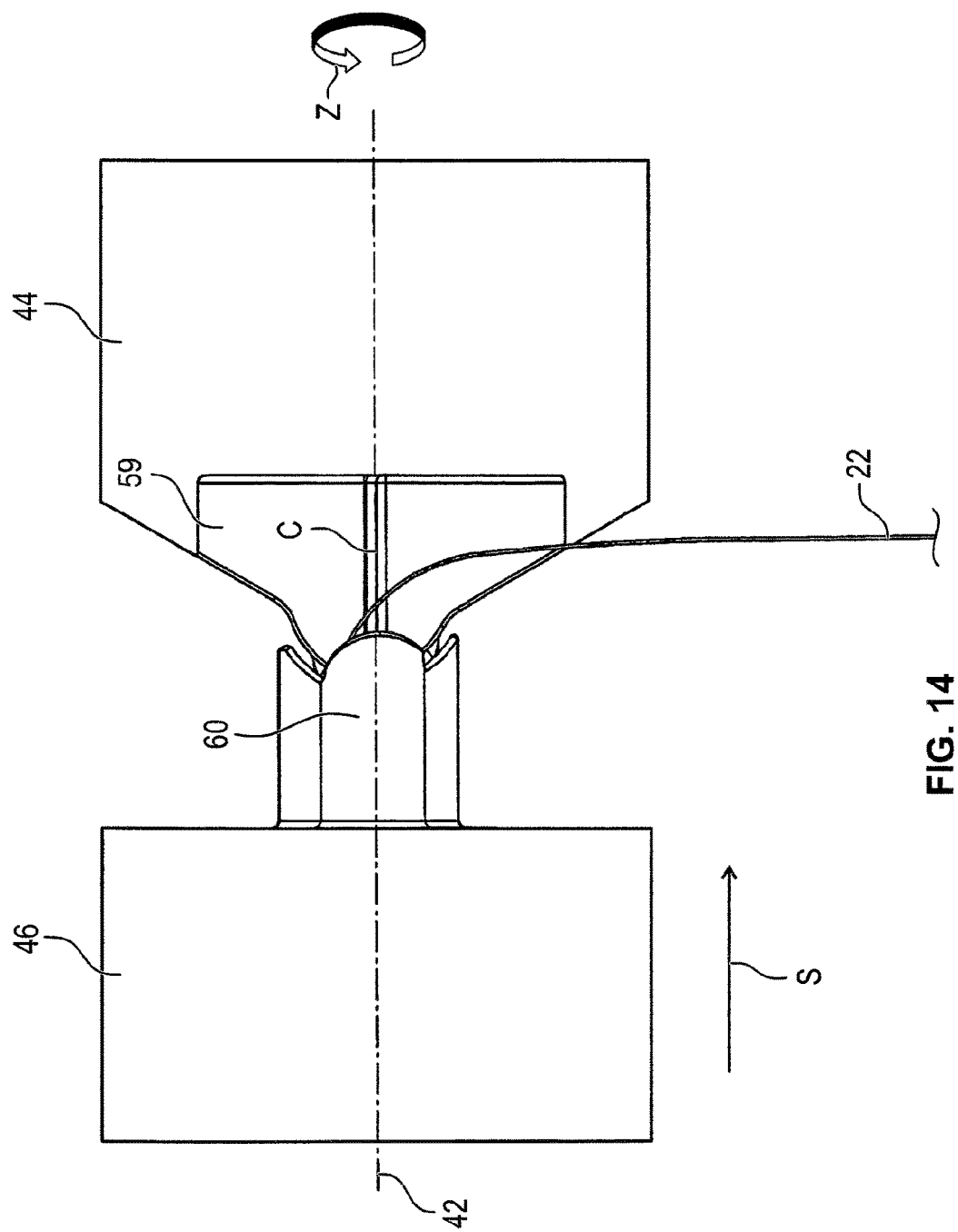

FIG. 13 shows the inventive device in the position in which the tool bodies 44, 46 are moved apart, as described in FIGS. 7 to 12, and the wire element 22 is inserted and clamped with its wire beginning on the mount 54. FIG. 14 shows the closed state of the inventive device according to FIG. 13 at the beginning of the winding procedure, wherein the wire element 22 is then wound between the molding surfaces 48, 50 and the surface extensions 48a, 50a and the winding gap 56 formed between them and the gap sections 56a, 56b position by position until forming the preformed coil 20.

Figure 15:
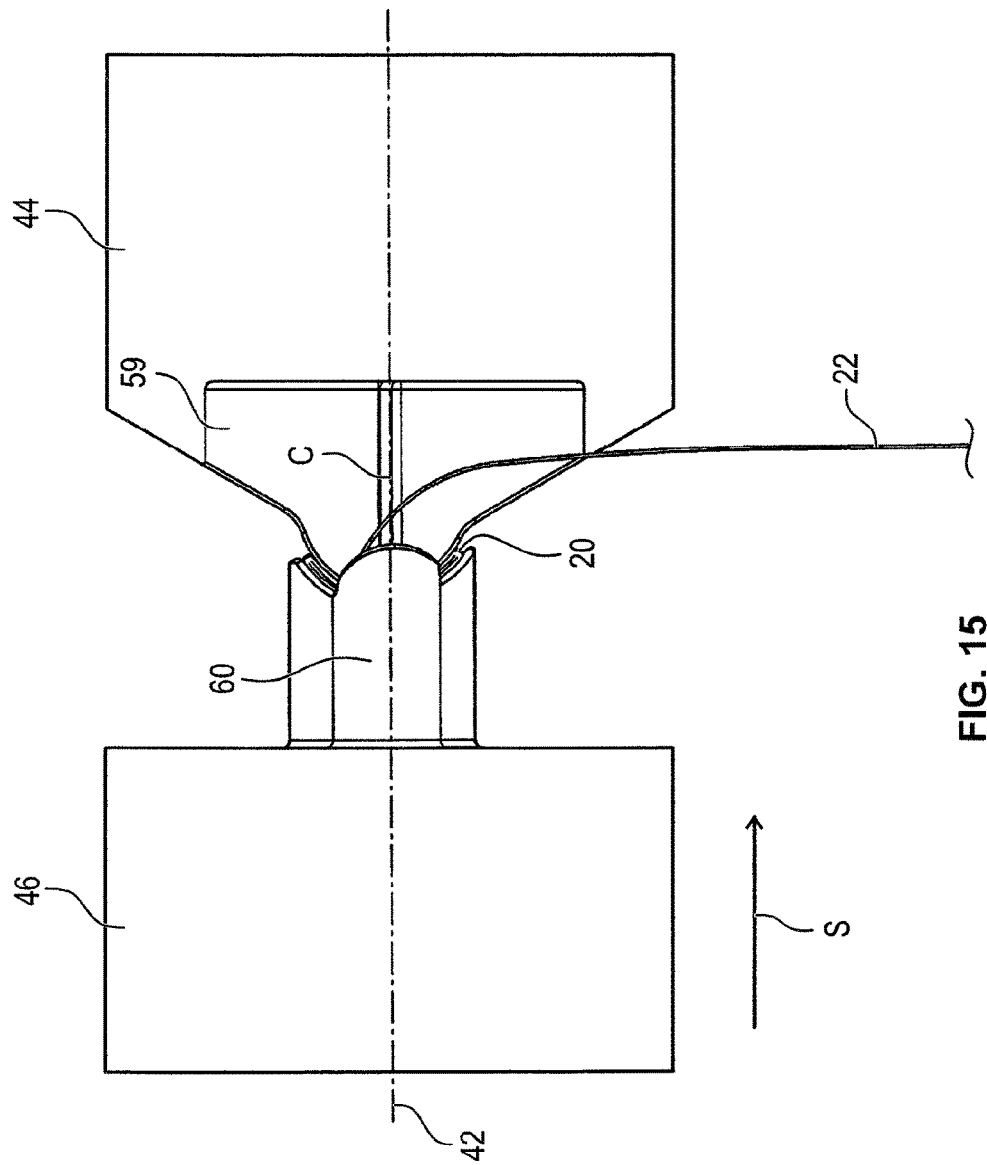

The inventive device is shown in FIG. 15 in the closed state after completion of the winding process, wherein it can be recognized that the preformed coil 20 is completely wound, since the winding gap 56 between the tool bodies 44, 46 is completely filled with the completely wound preformed coil 20.

Figure 16:
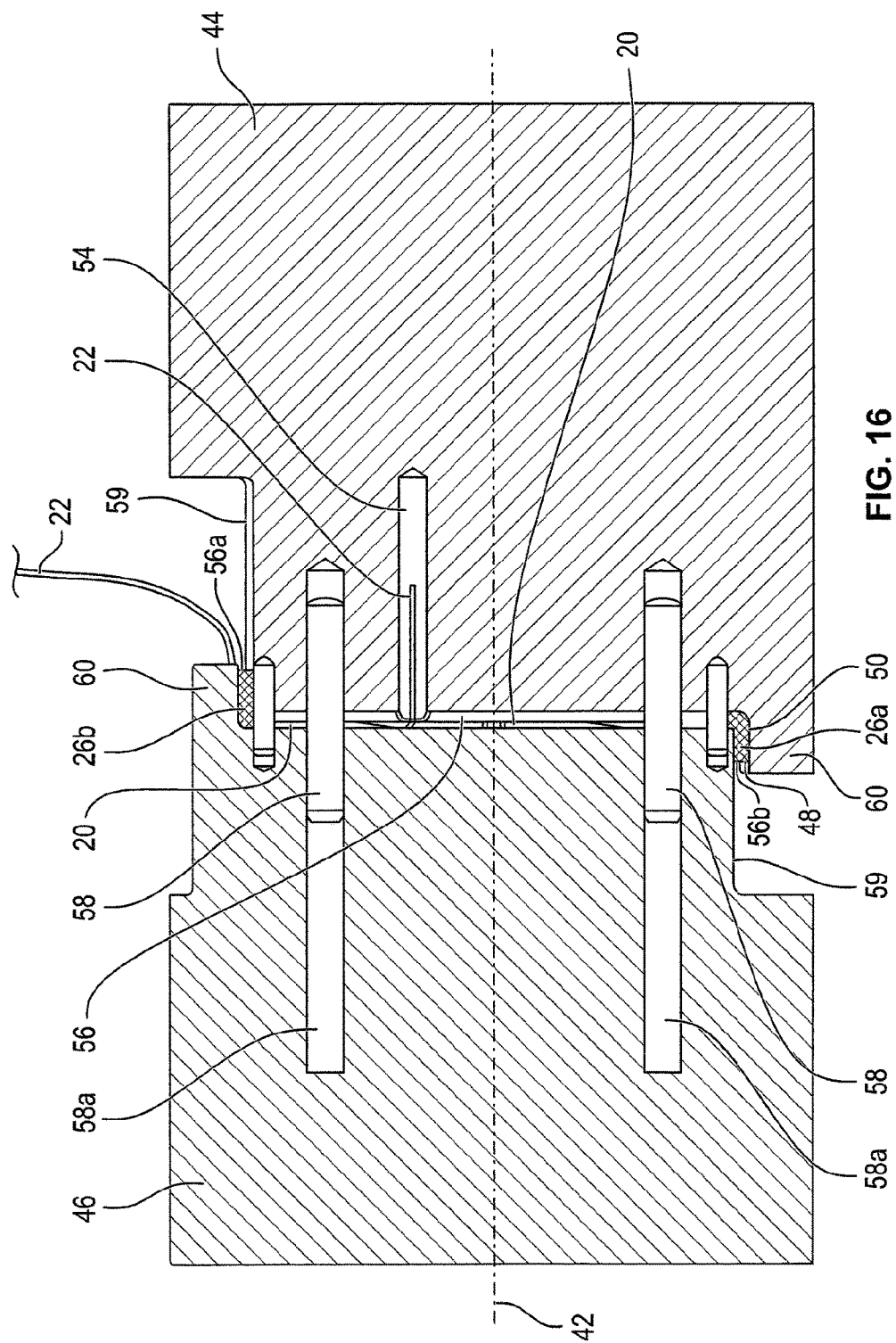

The completely wound preformed coil 20 is shown in FIG. 16 in a cross-sectional view with its folded front ends 26a, 26b in the still closed state of the inventive device. In this case, the position of the folded front ends 26a, 26b of the preformed coil 20 can be seen between the flat areas 59 and the tool body attachments 60 of the tool bodies 44, 46. Also shown here is how the guide elements 58 engage in the opposite guide borings 58a.

Figure 17:
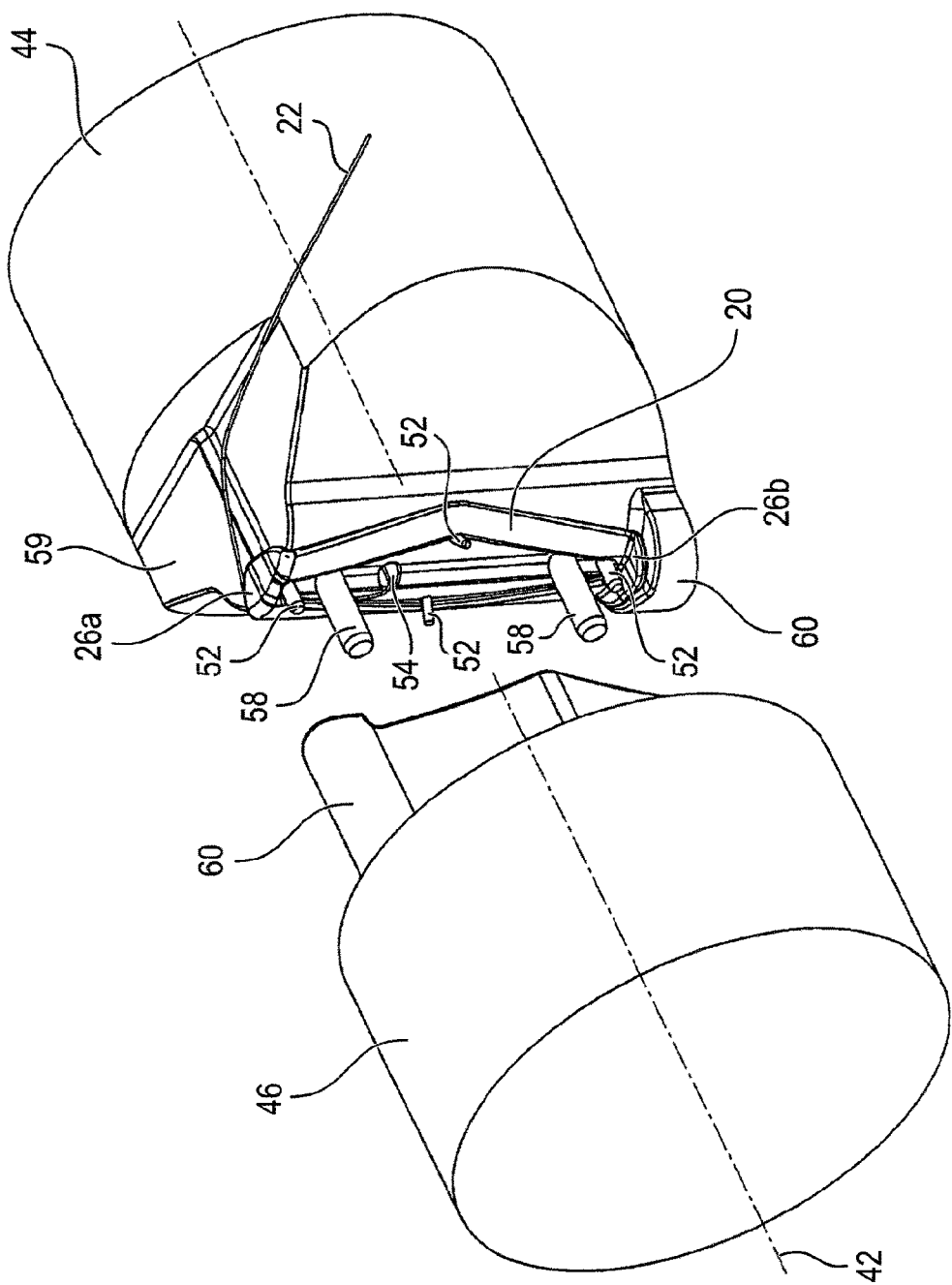

The open position of the inventive device is shown in FIG. 17 after completion of the preformed coil 20 in which the preformed coil 20 can be removed from the inventive tool.

Finally, the inventive procedure to manufacture a preformed coil 20 for a self-supporting skewed winding 6 is described. Inventively, the preformed coil 20 is formed by directly shaping the wire element 22 during the winding process because of the winding forces occurring in this case—and thus without subsequent deformation of the completely wound preformed coil 20—with its variously curved preformed coil sides 24a and 24b, as well as with the front offset sections 28 and, if applicable, with the folded front ends 26a, 26b. This occurs with the inventive device according to FIGS. 7 to 12 and FIGS. 13 to 17 as described above. After the shaping winding process of the preformed coil 20, it is temporarily heated to cement a thermoset varnish coating 25 of the wire element 22. An electric heating current is preferably temporarily applied to the preformed coil 20, so that the heating occurs by means of internal current heat. The direction of winding during the winding process is shown with the arrow Z.

After a certain cooling time, the completed preformed coil 20 is removed from the device by moving the tool bodies 44, 46 to the removal position according to FIG. 12 and FIG. 17. It can be advantageous for the removal to detachably affix at least a partial quantity of winding elements 52 on the respective winding element, so that at least a part of the winding elements 52 can be removed before removing the preformed coil 20.

After manufacturing a certain number of preformed coils 20, they are assembled to form a winding body 18 with area-wise overlapping, mechanically fixed, as well as temporarily heated to cement the thermoset varnish coatings 25. Resulting therefrom is the self-supporting skewed winding 6, as shown in FIGS. 2, 3 and 6b.

The invention is not limited to the shown and described exemplary embodiments, but also comprises all similarly acting designs consistent with the invention. It is expressly emphasized that the exemplary embodiments are not limited to the characteristics in combination, but instead each individual partial characteristic has inventive significance independently of all other partial characteristics as such.

Furthermore, the invention has as yet not been limited to the characteristics defined in the respective independent claim, but instead can be defined by any other desired combination of specific characteristics of all disclosed individual characteristics. This means that basically practically each individual characteristic of the independent claim can be omitted and be replaced by at least one individual characteristic disclosed elsewhere in the application.

The invention claimed is:

1. A preformed coil to produce a self-supporting skewed winding with an air-gap for an electric motor having at least two preformed coils positioned overlapping on a circumference of the winding, the preformed coil comprising at least one winding of an electrically conducting wire element extending over 360° around a longitudinal axis, wherein a radially inner preformed coil body portion is formed around a cylindrical shape having a first curvature radius and a radially outer preformed coil body portion is formed around a cylindrical shape having a second curvature radius greater than the first radius, wherein the radially inner and radially outer preformed coil body portions are connected with each other at first and second axial ends via end connections, wherein the end connections have winding offset sections bridging an offset between the first curvature radius and the second curvature radius of the inner and outer preformed coil sides, wherein the offset sections are formed by directly bending the wire element of the winding during a winding process and by bending forces acting on the wire element during the winding process without any subsequent deformation of the preformed coil after the winding process, without any length change of the wire element, without mechanical tension stress in the winding element, and without any previously prepared feed line as a length reservoir.

2. The preformed coil according to claim 1, wherein the at least one winding forms a rhomboid winding, or a trapezoid winding, or an elliptical winding, or a rhomboid winding modified with a straight central part, or a modified rhomboid winding having a maximum transverse width extending tangentially relative to the longitudinal axis, which is shorter than a maximum longitudinal length along the longitudinal axis between the first and second axial ends.

3. The preformed coil according to claim 1, wherein the preformed coil comprises at least two windings and all of the at least two windings are wound in an identical winding direction.

4. The preformed coil according to claim 1, wherein the radially outer preformed coil body portion defines a third curvature radius of an outside surface of the radially outer preformed coil side, wherein the first, the second, and the third curvature radii of the inner and outer coil body portions of the preformed coil are each constant along the longitudinal axis of the preformed coil from the first axial end to the second axial end, wherein the offset sections extend radially relative to the longitudinal axis.

5. The preformed coil according to claim 1, wherein the radially outer preformed coil body portion defines a third curvature radius of the outside surface of the radially outer preformed coil body portion wherein the first, the second, and the third radii of curvature of the inner and outer coil body portions of the preformed coil along the longitudinal axis of the preformed coil from the first axial end to the second axial end constantly increase, wherein the offset sections extend radially and axially relative to the longitudinal axis.

6. The preformed coil according to claim 1, wherein the radially outer preformed coil body portion defines a third curvature radius of an outside surface of the radially outer preformed coil side, wherein the first, the second, and the third curvature radii of the inner and outer coil body portions of the preformed coil along the longitudinal axis from the first axial end to the second axial end are constant along a first section and continually increase or decrease along a second section adjacent thereto.

7. The preformed coil according to claim 1, wherein the first and second axial ends are folded inward at a fold angle from 0 to 90° relative to the longitudinal axis, in a direction toward the longitudinal axis or outward away from the longitudinal axis.

8. The preformed coil according to claim 1, wherein the wire element is spirally wound in one or more layers and crossing-free from a winding beginning to a winding end.

9. The preformed coil according to claim 1, wherein the wire element consists of an individual wire with a circular or rectangular cross-section or of a parallel wire with at least two wires running parallel next to each other and bonded to each other, or of a stranded wire.

10. The preformed coil according to claim 9, wherein the wire element is a parallel wire with parallel individual wires, wherein the parallel individual wires lie next to each other inside individual windings and radially offset from each other in the preformed coil.

11. The preformed coil according to claim 1, wherein the preformed coil forms a winding body having a rectangular, arc-shaped coil cross-section in relation to a vertical cut plane extending to the longitudinal axis of the winding body.

12. A process to produce a preformed coil according to claim 1, wherein the preformed coil is formed by directly shaping the at least one individual winding of the wire element during a winding process and without any subsequent deformation of the completely wound preformed coil with the curved preformed coil body portions wherein the first and second radii of curvature are formed by the forces occurring during the winding.

13. The process according to claim 12, wherein after the shaping process, the preformed coil is temporarily heated in order to electrically cement a thermoset varnish coating of the wire material or is coated with a dip varnish or encapsulated in plastic.

14. The process according to claim 13, wherein an electric current is temporarily applied to the preformed coil for temporary heating.

15. A device for manufacturing a preformed coil with the process according to claim 12, further comprising a winding device that is driven to rotate around a rotation axis, wherein the winding device is divided into two tool bodies perpendicular to the rotation axis and, on sides facing each other, includes complementary molding surfaces shaped negatively and corresponding to inner and outer surface contours of the preformed coil to be wound, the molding surfaces having lateral areas to form the inner and outer coil body portions of the preformed coil curved at the different first and second curvature radii, as well as transition areas to form the offset sections, wherein in the area of at least one of the molding surfaces, winding elements are positioned as deflecting points to determine a course of the windings of the wire element.

16. The device according to claim 15, further comprising, in the area of one of the molding surfaces, a mount for a winding beginning of the wire element.

17. The device according to claim 15, wherein at least a partial number of winding elements is detachably mounted to remove the completed preformed coil.

18. The device according to claim 15, wherein the tool bodies can be moved relative to each other in the direction of the rotation axis, between a removal position separated from one another and a winding position converging toward each other, wherein the molding surfaces are separated in the winding position by a winding gap which are dimensioned or adjustable to fit on the respective wire element such that the wire element is specifically guided with a winding play and can be guided with adapting shaping between the molding surfaces during the winding process.

19. The device according to claim 18, wherein in the longitudinal direction of the molding surfaces, the winding gap formed at opposite ends between the respective molding surfaces comprises gap sections running at an angle, adapted to the fold angle, of about 90° to the molding surfaces, which run in directions opposite to each other and serve to shape the axial ends with a fold angle, wherein surface extensions of the molding surfaces running into the gap sections feature the negative contour of the opposite surfaces of the axial ends.

20. The device according to claim 19, wherein each of the tool bodies comprises a surface extension constructed by a flat area of the tool body and a surface extension constructed on a tool body attachment, wherein the surface extension formed by the flat area is covered by the surface extension formed by the tool body attachment in the winding position, and the respective gap section is constructed between the flat area on one side and the tool body attachment on an opposite side.

21. The device according to claim 15, wherein the tool bodies can be moved out of the winding position toward each other along a path to fix the preformed coil.

22. The device according to claim 15, further comprising a device to apply an electric current to the wound and fixed preformed coil dimensioned with respect to time and current such that the preformed coil is heated by current heat to cement a wire thermoset varnish coating.

23. The device according to claim 15, wherein the two tool bodies are guided along axial guide elements relative to each other aligned in the rotation direction.

24. A self-supporting air-gap winding for insertion into an electric motor comprising at least two of the preformed coils according to claim 1, the at least two of the preformed coils overlapping and positioned on a coil circumference.

* * * * *